(12) United States Patent
Fan et al.

(10) Patent No.: US 8,400,593 B2
(45) Date of Patent: Mar. 19, 2013

(54) ELECTRO-OPTICAL DEVICE

(75) Inventors: Shih-Kang Fan, Hsinchu (TW); Cheng-Pu Chiu, Zhonghe (TW)

(73) Assignee: National Chiao Tung University, Hsinchu (TW)

( * ) Notice: Subject to any disclaimer, the term of this patent is extended or adjusted under 35 U.S.C. 154(b) by 204 days.

(21) Appl. No.: 12/765,642

(22) Filed: Apr. 22, 2010

(65) Prior Publication Data

US 2011/0096276 A1    Apr. 28, 2011

(30) Foreign Application Priority Data

Oct. 22, 2009   (TW) ............................... 98135777 A (51) Int. Cl.
*G02F 1/1333* (2006.01)
*G02F 1/133* (2006.01)

(52) U.S. Cl. .......................................... 349/122; 349/21

(58) Field of Classification Search .................. 349/122, 349/21

See application file for complete search history.

(56) References Cited

U.S. PATENT DOCUMENTS

| | | | | |
|---|---|---|---|---|
| 2,062,468 | A * | 12/1936 | Matz .............................. | 359/291 |
| 7,224,534 | B2 * | 5/2007 | Ootsuka et al. ............... | 359/665 |
| 7,265,910 | B2 * | 9/2007 | Ito et al. ........................ | 359/666 |
| 7,265,911 | B2 * | 9/2007 | Goosey et al. ................ | 359/676 |
| 7,605,984 | B2 * | 10/2009 | Yeh et al. ...................... | 359/666 |
| 7,859,640 | B2 * | 12/2010 | Galstian et al. ............... | 349/200 |
| 7,862,183 | B2 * | 1/2011 | Frahm et al. .................. | 353/101 |
| 8,040,583 | B2 * | 10/2011 | Takahashi ..................... | 359/228 |
| 2006/0044448 | A1 * | 3/2006 | Kato et al. ..................... | 348/335 |
| 2006/0050402 | A1 * | 3/2006 | Ito et al. ........................ | 359/666 |
| 2006/0050412 | A1 * | 3/2006 | Ito et al. ........................ | 359/745 |
| 2006/0056008 | A1 * | 3/2006 | Ito et al. ........................ | 359/296 |
| 2006/0193058 | A1 * | 8/2006 | Ootsuka et al. ............... | 359/665 |
| 2006/0280100 | A1 * | 12/2006 | Ooi et al. ................... | 369/112.02 |
| 2007/0041101 | A1 * | 2/2007 | Goosey et al. ................ | 359/676 |
| 2007/0070509 | A1 * | 3/2007 | Yeh et al. ...................... | 359/638 |
| 2007/0229754 | A1 * | 10/2007 | Galstian et al. ............... | 349/200 |
| 2008/0247743 | A1 * | 10/2008 | Liang et al. ................... | 396/175 |
| 2009/0096999 | A1 * | 4/2009 | Frahm et al. .................. | 353/101 |
| 2010/0053717 | A1 * | 3/2010 | Takahashi ..................... | 359/228 |
| 2010/0073641 | A1 * | 3/2010 | Han et al. ........................ | 353/38 |
| 2010/0096993 | A1 * | 4/2010 | Ashdown et al. ............. | 315/113 |
| 2010/0289941 | A1 * | 11/2010 | Ito et al. ........................ | 348/345 |
| 2010/0315605 | A1 * | 12/2010 | Arita ................................ | 353/98 |
| 2011/0109823 | A1 * | 5/2011 | Galstian et al. ................. | 349/33 |
| 2011/0212751 | A1 * | 9/2011 | Havens et al. ............. | 455/556.1 |

\* cited by examiner

*Primary Examiner* — K. Cyrus Kianni
(74) *Attorney, Agent, or Firm* — Ladas & Parry, LLP (57) ABSTRACT

An electro-optical device includes a body of fluid, a lower conductor layer disposed below the body of fluid, and a dielectric layer disposed between the body of fluid and the lower conductor layer, connected to the lower conductor layer and supporting the body of fluid. The dielectric layer includes a matrix and a liquid crystal material disposed in the matrix and including liquid crystal molecules. The dielectric layer has a segment disposed adjacent to the fluid. When the segment of the dielectric layer is exposed to an electric field, the body of fluid undergoes electrowetting or dielectrophoresis mechanism, and the orientation of the liquid crystal molecules that are disposed in the segment of the dielectric layer is changed.

12 Claims, 12 Drawing Sheets

ELECTRO-OPTICAL DEVICE

CROSS-REFERENCE TO RELATED APPLICATION

This application claims priority of Taiwanese Application No. 098135777, filed on Oct. 22, 2009.

BACKGROUND OF THE INVENTION

1. Field of the Invention

This invention relates to an electro-optical device, more particularly to an electro-optical device that includes a body of fluid and a dielectric layer with a liquid crystal material.

2. Description of the Related Art

Electro-optical devices, such as liquid lenses and electrophoretic displays, can provide an information display function.

Figure 1A:
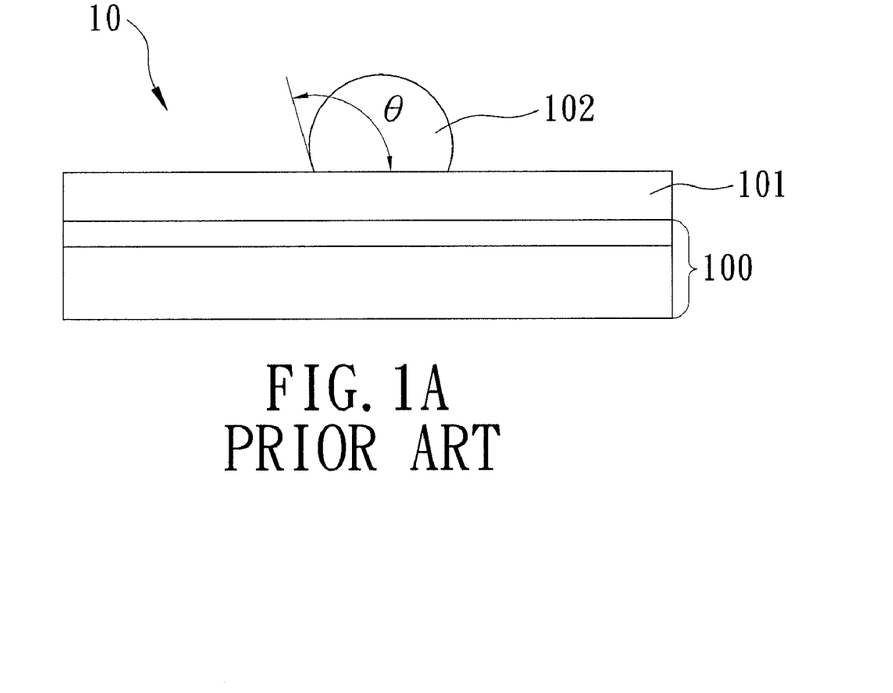
FIGS. 1A and 1B are schematic views illustrating configurations of a conventional liquid lens under off and on states, respectively.
Figure 1B:
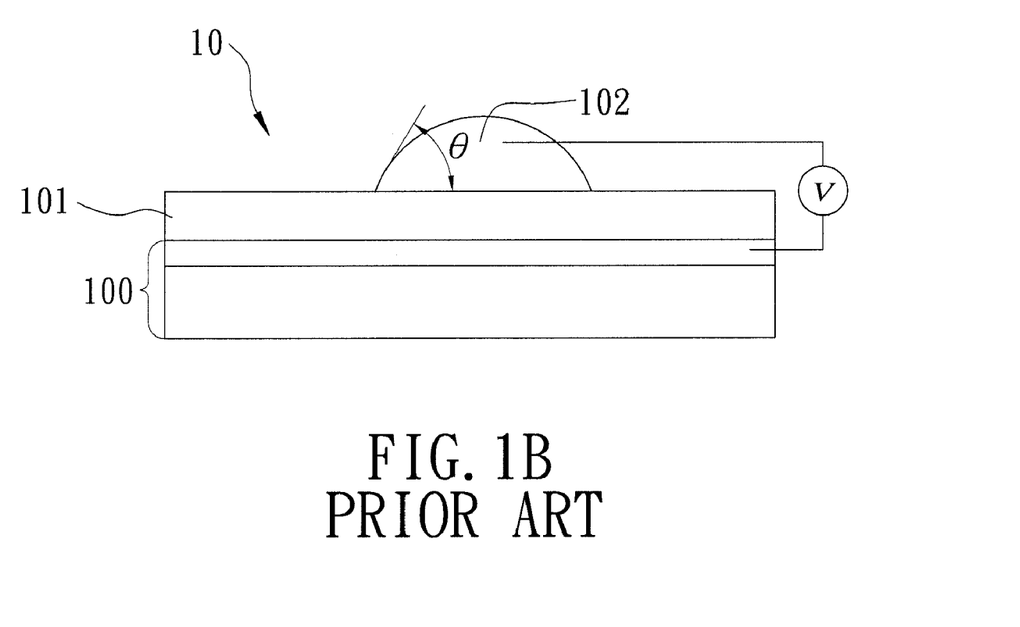
Figure 2A:
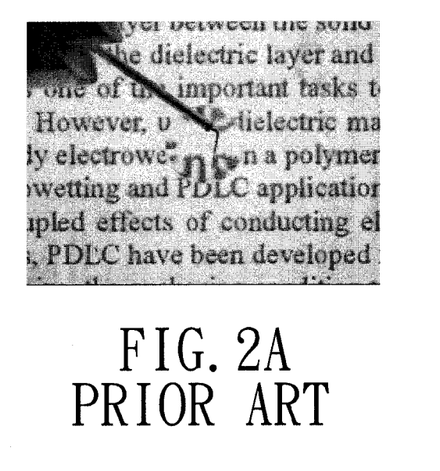
FIGS. 2A and 2B are photo images of display results of the conventional liquid lens under off and on states, respectively.
Figure 2B:
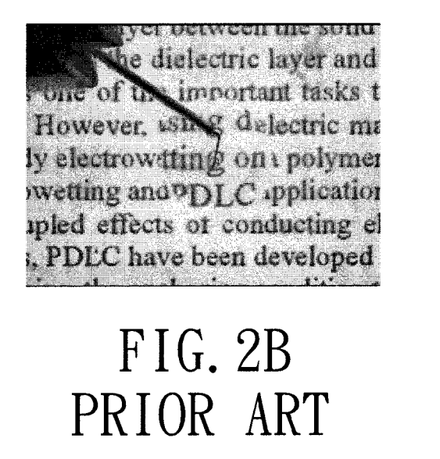

FIGS. 1A and 1B illustrate a conventional liquid lens 10 under off and on states, respectively. The liquid lens 10 includes a conductive substrate 100, a dielectric layer 101 formed on the substrate 100, and a conductive liquid droplet 102 disposed on the dielectric layer 101. At the off state (no voltage is applied), the surface energy of the surface of the dielectric layer 101 is relatively low, thereby leading the liquid droplet 102 to exhibit a relatively large contact angle ($\theta$). At the on state (a voltage is applied), the surface energy of the surface of the dielectric layer 101 is increased, thereby resulting in a decrease in the contact angle ($\theta$) and permitting the liquid droplet 102 to undergo electrowetting. FIGS. 2A and 2B show photo images of display results of the conventional liquid lens 10 under off and on states, respectively. The results show that the conventional liquid lens 10 suffers from poor clarity and poor contrast when displaying a piece of information placed under the liquid lens 10.

SUMMARY OF THE INVENTION

Therefore, an object of the present invention is to provide an electro-optical device that can overcome the aforesaid drawback associated with the prior art.

According to this invention, there is provided an electro-optical device including a body of fluid, a lower conductor layer that is disposed below the body of fluid, and a dielectric layer that is disposed between the body of fluid and the lower conductor layer, connected to the lower conductor layer, and supporting the body of fluid. The dielectric layer includes a matrix of a dielectric material and a liquid crystal material disposed in the matrix and including liquid crystal molecules. The dielectric layer has a segment disposed adjacent to the body of fluid. When the segment of the dielectric layer is exposed to an electric field, the body of fluid undergoes electrowetting or dielectrophoresis mechanism and the orientation of the liquid crystal molecules that are disposed in the segment of the dielectric layer is changed.

BRIEF DESCRIPTION OF THE DRAWING

Other features and advantages of the present invention will become apparent in the following detailed description of the preferred embodiments of this invention, with reference to the accompanying drawings, in which.

DETAILED DESCRIPTION OF THE PREFERRED EMBODIMENTS

The term "fluid" as used in the following description can be conductive or non-conductive. Examples of the fluid include, but are not limited to, a gas (such as air), a bubble, a liquid (such as water or oil), etc.

Before this invention is described in greater detail with reference to the accompanying preferred embodiments, it should be noted herein that like elements are denoted by the same reference numerals throughout the disclosure.

Figure 3A:
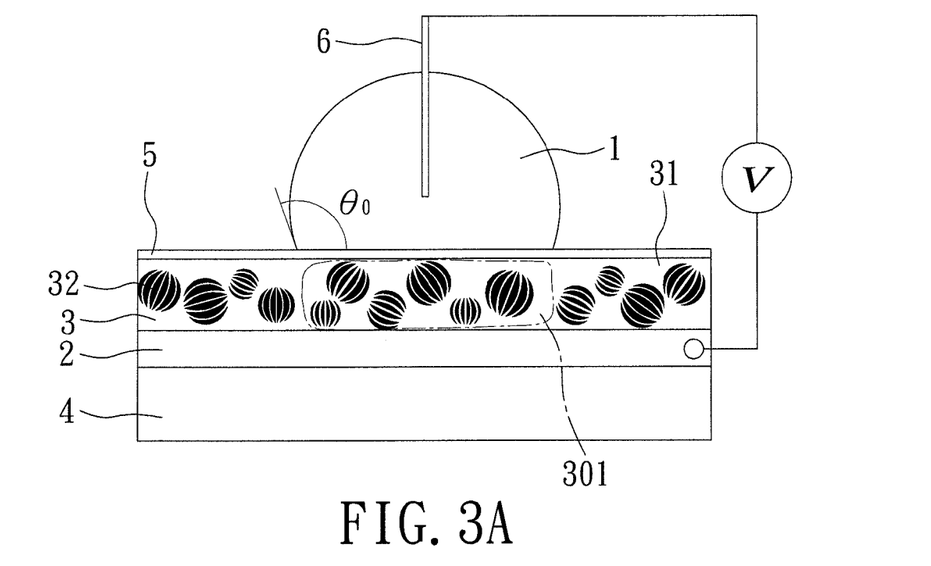
FIGS. 3A and 3B are schematic views illustrating configurations of a first preferred embodiment of an electro-optical device according to this invention under off and on states, respectively.
Figure 3B:
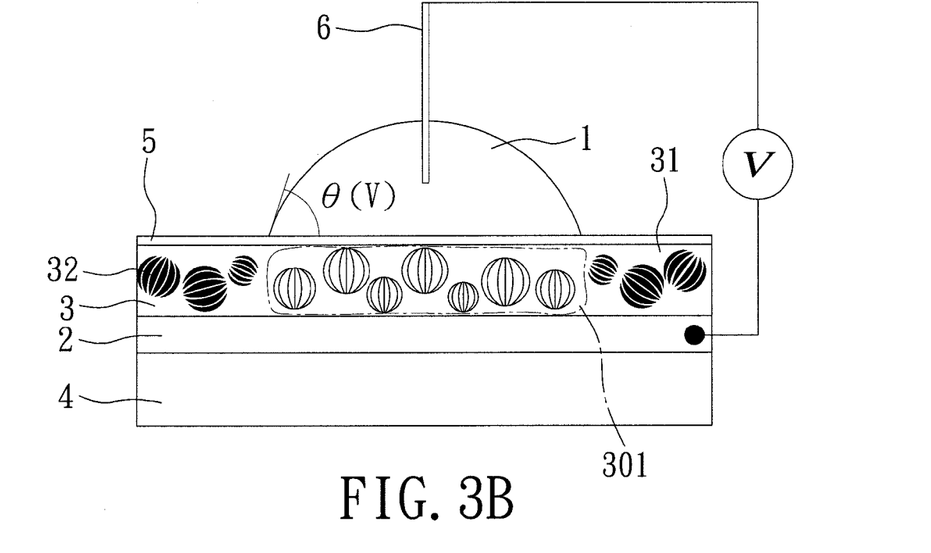

Referring to FIGS. 3A and 3B, the first preferred embodiment of an electro-optical device according to this invention includes a transparent substrate 4, a body of fluid 1, a lower conductor layer 2 disposed below the body of fluid 1 and formed on the substrate 4, a dielectric layer 3 disposed between the body of fluid 1 and the lower conductor layer 2, connected to the lower conductor layer 2, and supporting the body of fluid 1, a hydrophobic layer 5 disposed between the body of fluid 1 and the dielectric layer 3, and a power supply 6 connected to the fluid 1 and the lower conductor layer 2 and including a probe extending into the fluid 1. The dielectric layer 3, the lower conductor layer 2 and the body of fluid 1 are arranged along a normal direction relative to the dielectric layer 3. The dielectric layer 3 includes a matrix 31 of a dielectric material and a liquid crystal material disposed in the matrix 31 and including liquid crystal molecules. The dielectric layer 3 has a segment 301 that is covered by the body of fluid 1.

In the first preferred embodiment, the body of fluid 1 is conductive and is in the form of a liquid droplet.

Preferably, the matrix 31 of the dielectric layer 3 is a polymer, and the liquid crystal material includes a plurality of droplets 32 of the liquid crystal molecules dispersed in the polymer. In the first preferred embodiment, the dielectric material of the matrix 31 is polydimethylsiloxane (PDMS).

Referring to FIG. 3A, when the electro-optical device is at an off state, the contact angle between the body of fluid 1 and the hydrophobic layer 5 is $\theta_0$, and the liquid crystal molecules of the droplets 32 are randomly oriented. As a consequence, the transmittance at the segment 301 is the same as that of the remainder of the dielectric layer 3.

Referring to FIG. 3B, when the electro-optical device is at an on state and when the segment 301 is exposed to an electric field, the fluid 1 undergoes electrowetting mechanism, i.e., the body of fluid 1 spreads outwardly, such that the contact angle is changed from $\theta_0$ to $\theta(v)$, which results in an increase in the area of the segment 301 covered by the body of fluid 1, and at the same time, the liquid crystal molecules of the droplets 32 disposed in the segment 301 of the dielectric layer 3 are affected by the electric field such that their orientations are changed from the randomly oriented state to a uniformly oriented state, which results in an increase in the transmittance at the segment 301.

Preferably, the electro-optical device in the first embodiment is used as a variable focus lens.

Figure 4A:
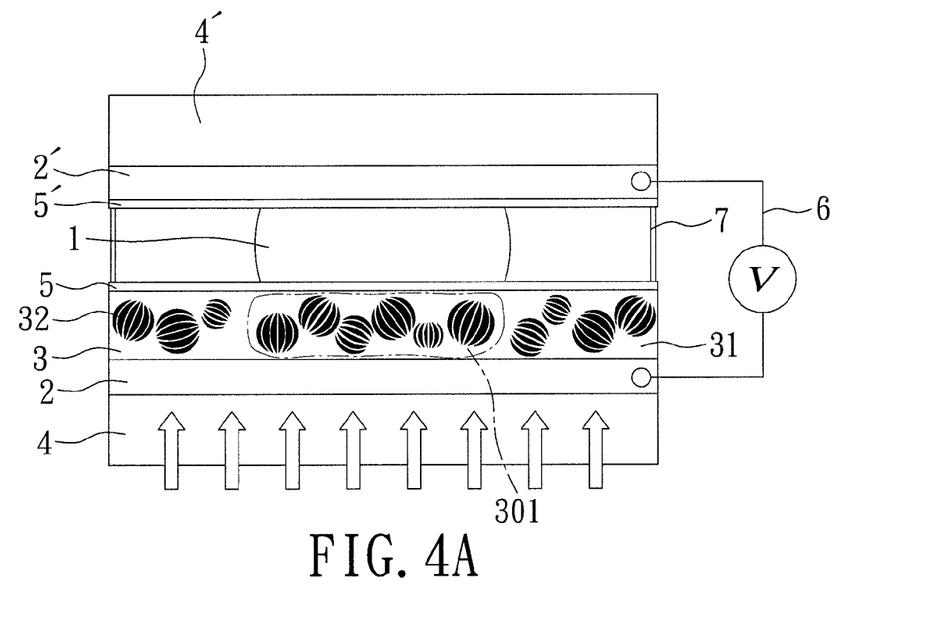
FIGS. 4A and 4B are schematic views illustrating configurations of a second preferred embodiment of an electro-optical device according to this invention under off and on states, respectively.
Figure 4B:
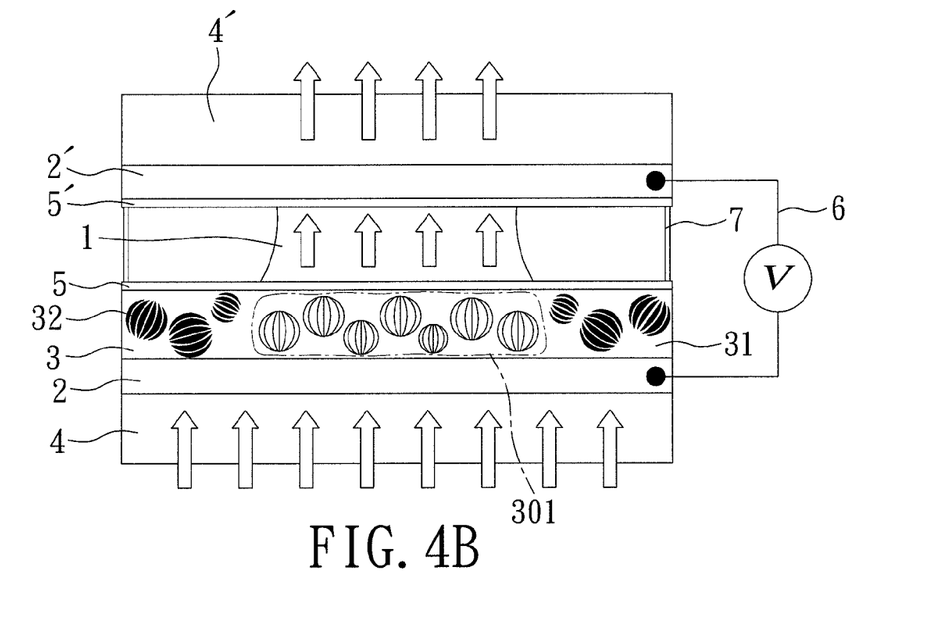

Referring to FIGS. 4A and 4B, the second preferred embodiment of an electro-optical device according to this invention has the same configuration as that of the first preferred embodiment, except that the second preferred embodiment further includes an upper conductor layer 2' disposed above the dielectric layer 3, a confining wall 7 that is disposed above the dielectric layer 3 and that defines an inner space between the upper conductor layer 2' and the dielectric layer 3, an upper hydrophobic layer 5' disposed on the confining wall 7 and attached to the upper conductor layer 2', and an upper substrate 4' disposed on the upper conductor layer 2'. In this embodiment, the power supply 6 is connected to the upper and lower conductor layers 2', 2.

In the second preferred embodiment, the body of fluid 1 and the liquid crystal molecules of the droplets 32 undergo the state changes described in the first preferred embodiment when the electro-optical device is applied with a voltage.

It is noted that in FIGS. 4A and 4B, the arrows represent the incident light. At the off state, as best shown in FIG. 4A, the incident light is scattered by the liquid crystal molecules of the droplets 32 of the dielectric layer 3, so that the electro-optical device exhibits a poor contrast. At the on state, as best shown in FIG. 4B, the incident light passes through the segment 301 of the dielectric layer 3 along the normal direction, while the incident light is scattered in the remainder of the dielectric layer 3. As such, the electro-optical device can provide a sharp contrast effect.

Figure 5A:
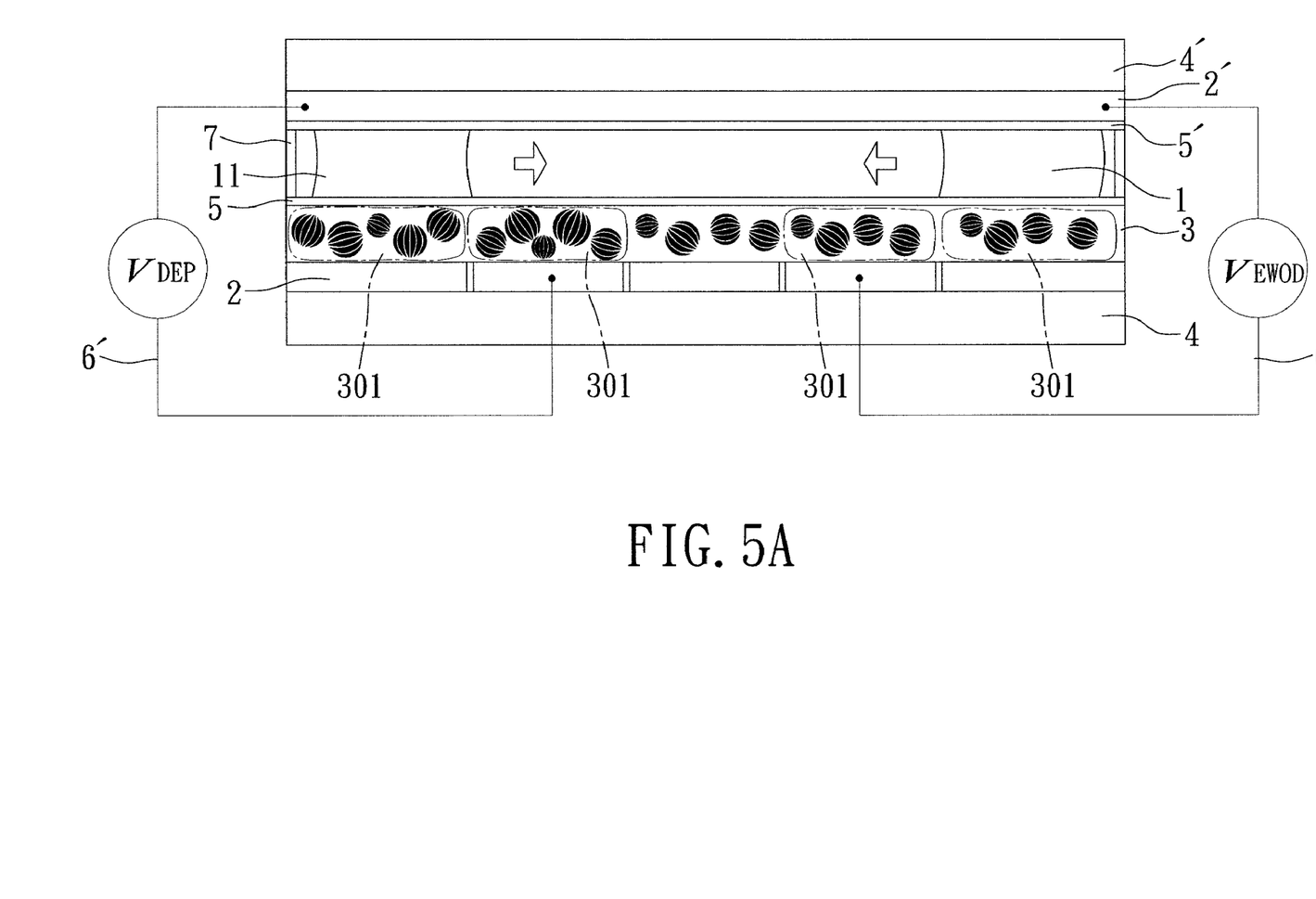
FIGS. 5A and 5B are schematic views illustrating configurations of a third preferred embodiment of an electro-optical device according to this invention under off and on states, respectively.
Figure 5B:
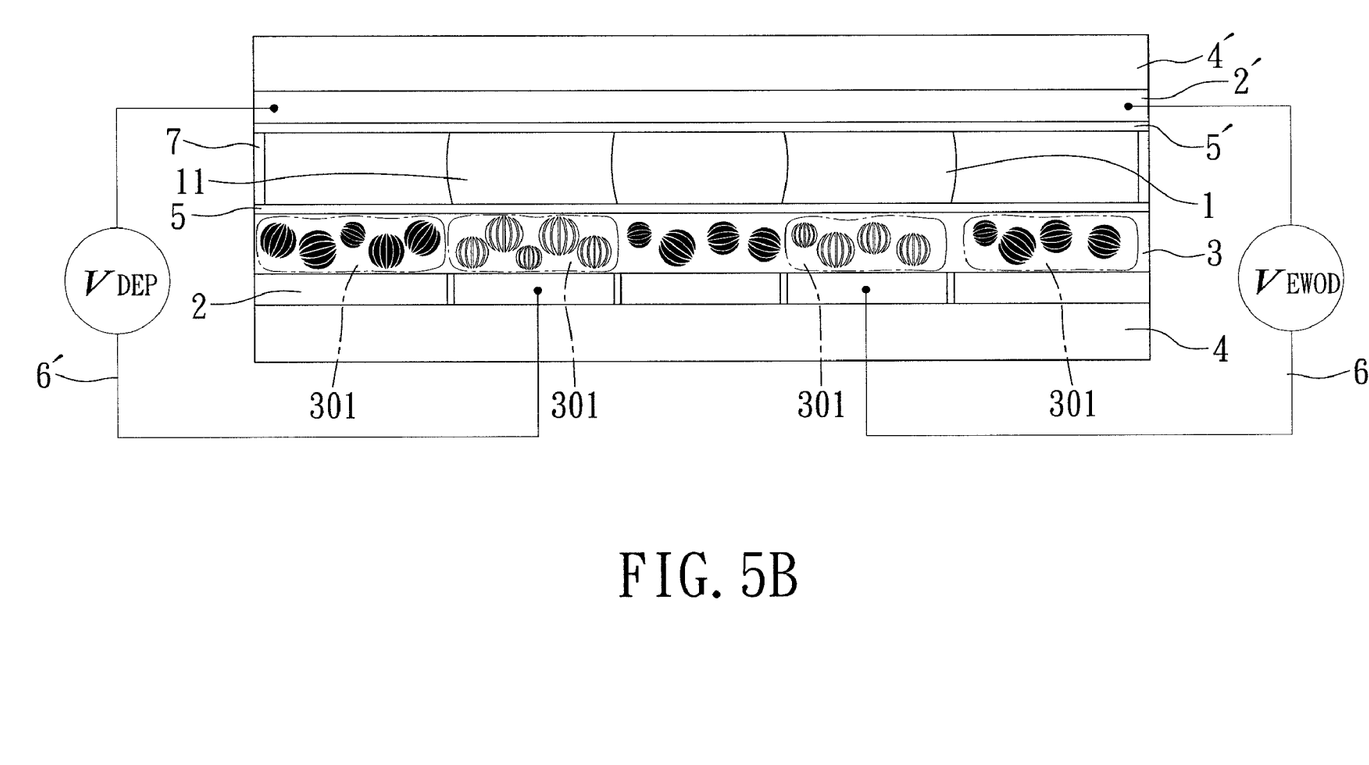
Figure 6:
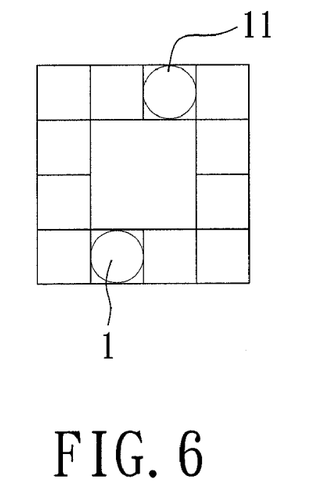
FIG. 6 is a schematic top view illustrating the configuration of the third preferred embodiment.

Referring to FIGS. 5A and 5B, the third preferred embodiment of an electro-optical device according to this invention has the same configuration as that of the second preferred embodiment, except that in the third preferred embodiment, the lower conductor layer 2 includes a plurality of electrodes that are disposed along a square loop, as best shown in FIG. 6, and that a dielectric oil 11 is further included in the third preferred embodiment in addition to the fluid 1, is received in the inner space defined between the upper conductor layer 2' and the dielectric layer 3, and is spaced apart from and is immiscible with the fluid 1. The dielectric layer 3 includes a plurality of segments 301 corresponding to and covering the electrodes of the lower conductor layer 2, respectively.

In FIG. 5A, when the electro-optical device is at the off state, the body of fluid 1 covers one of the segments 301 and a portion of an adjacent one of the segments 301, while the dielectric oil 11 covers another one of the segments 301 of the dielectric layer 3.

In FIG. 5B, when the electro-optical device is at the on state, the body of fluid 1 undergoes electrowetting mechanism and is moved from the segment 301 of the dielectric layer 3 to the adjacent one of the segments 301, while the dielectric oil 11 undergoes dielectrophoresis mechanism and is moved from said another one of the segments 301 of the dielectric layer 3 to an adjacent one of the segments 301 adjacent to said another one of the segments 301.

Figure 7A:
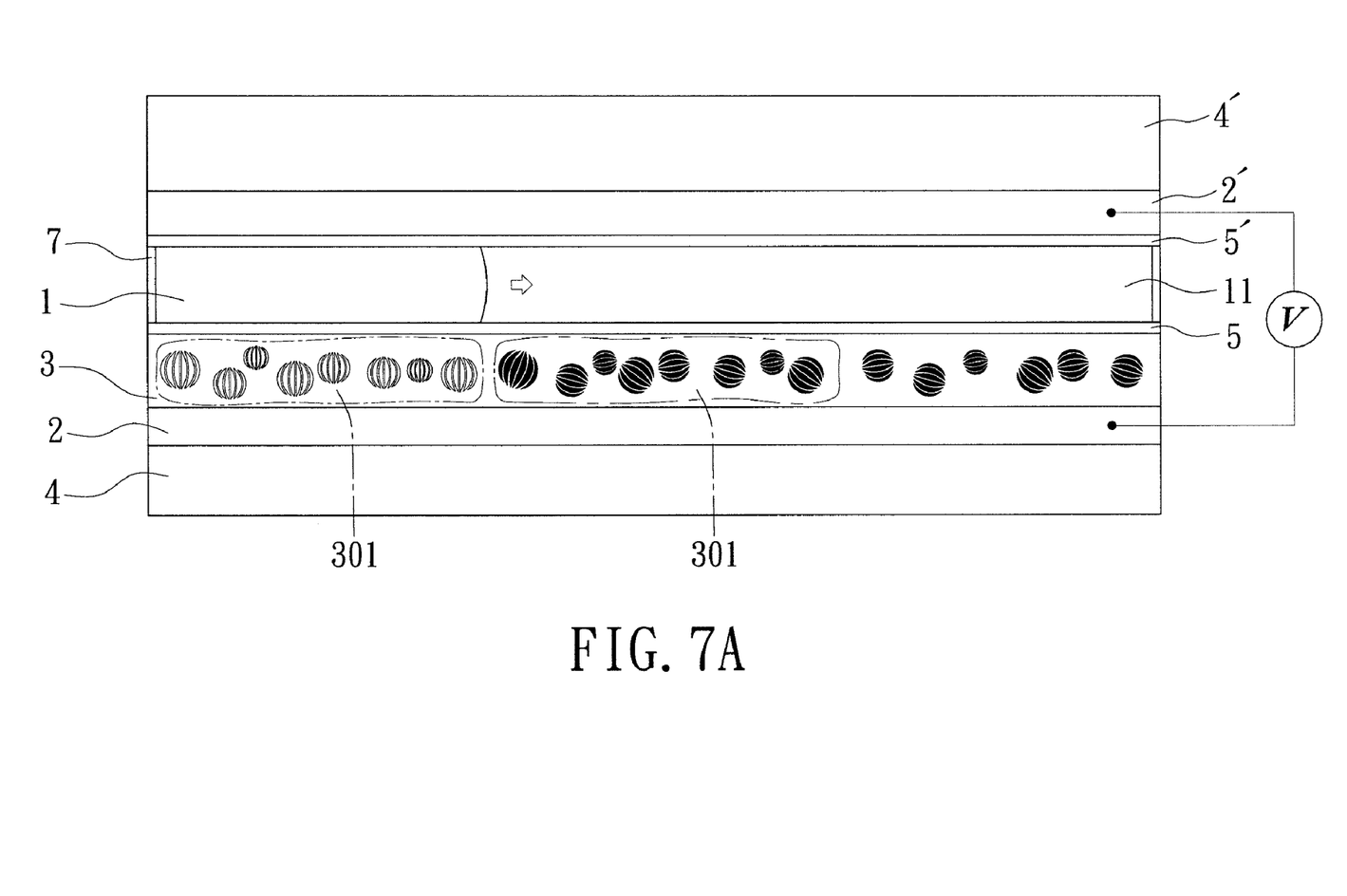
FIGS. 7A and 7B are schematic views illustrating configurations of a fourth preferred embodiment of an electro-optical device according to this invention under off and on states, respectively.
Figure 7B:
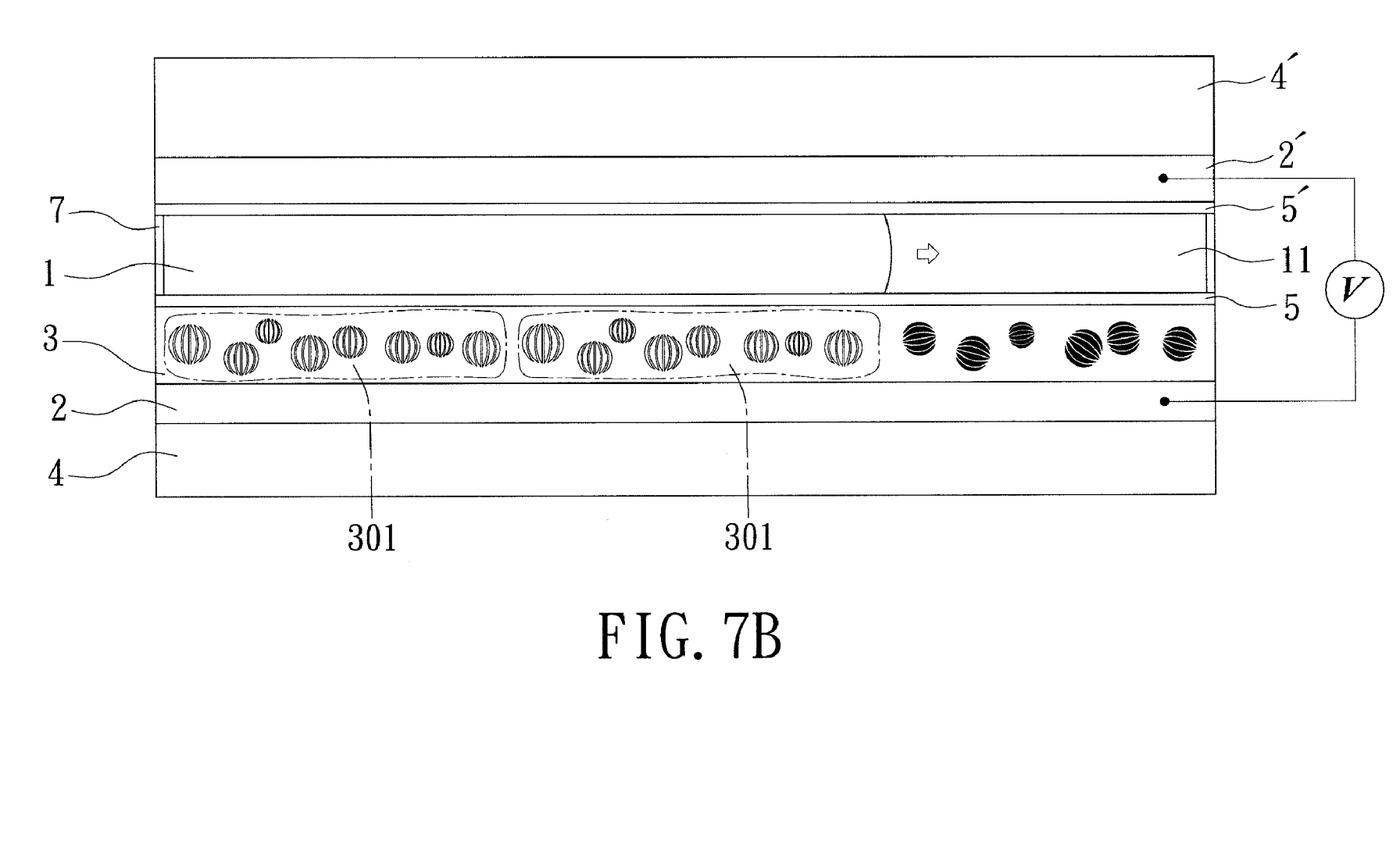

Referring to FIGS. 7A and 7B, the fourth preferred embodiment of an electro-optical device according to this invention has the same configuration as that of the second preferred embodiment, except that in the fourth preferred embodiment, the body of fluid 1 is surrounded by a dielectric oil 11 immiscible with the body of fluid 1, and that the lower conductor layer 2 includes a patterned electrode.

In FIG. 7A, when the electro-optical device is at the off state, the body of fluid 1 covers a segment 301 of the dielectric layer 3, while the dielectric oil 11 covers the remainder of the dielectric layer 3 which is larger than the segment 301.

In FIG. 7B, when the electro-optical device is at the on state, a dielectrophoresis force is generated at an interface between the body of fluid 1 and the dielectric oil 11, and causes the body of fluid 1 to spread outwardly, thereby driving the dielectric oil 11 to move toward one side of the electro-optical device and increasing the area of the segment 301 covered by the fluid 1.

The transmittance of the electro-optical device can be adjusted by modifying the composition of the dielectric layer (for example, the kind of the liquid crystal material and the amount of the liquid crystal material), the thickness of the dielectric layer, etc.

The following examples are provided to illustrate the merits of the preferred embodiments of the invention, and should not be construed as limiting the scope of the invention.

EXAMPLES

Example 1

Referring again to FIG. 3A, 8.3 wt % of a liquid crystal material (available from Merck CO., model name: E7) and 91.7 wt % of PDMS (available from Dow Corning Co., model name: Sylgard 184) were mixed to obtain a mixture. The mixture was spin-coated onto a conductive glass substrate that includes 100 nm thickness of an indium tin oxide layer (i.e., the lower conductor layer 2) and 0.7 mm thickness of a glass substrate (i.e., the substrate 4), followed by drying at 60° C. to obtain 10 μm thickness of a dielectric layer 3 on the conductive glass substrate. Then, Teflon was spin-coated onto the dielectric layer 3, followed by drying so as to form 50 nm thickness of a hydrophobic layer 5. Distilled water, which is in the form of a liquid droplet, was placed on the hydrophobic layer 5. A power supply 6 was connected the liquid droplet and the indium tin oxide layer 2 so as to obtain a variable focus lens.

Example 2

Referring again to FIG. 4A, the electro-optical device of Example 2 includes a lower unit and an upper unit, wherein the lower unit contains in order (from bottom to top): a lower substrate 4, a lower conductor layer 2, a dielectric layer 3, a lower hydrophobic layer 5 and a water droplet 1, and wherein the upper unit contains in order (from bottom to top): an upper hydrophobic layer 5', an upper conductor layer 2' and an upper substrate 4'. The lower unit and the upper unit were prepared according to the procedure and conditions in preparation of the variable focus lens of Example 1. A confining wall 7 is disposed above the dielectric layer 3 of the lower unit in order to limit the water droplet 1.

Comparative Example

The procedure and conditions in preparation of the variable focus lens of Comparative Example were similar to those of Example 1, except that in the Comparative Example, the dielectric layer 3 consisted of polydimethylsiloxane.

[Test]
1. Contact Angle:
0~200 $V_{rms}$ of voltage was applied to the variable focus lens of Example 1 and the contact angle between the water droplet 1 and the hydrophobic layer 5 of the variable focus lens was measured using a charge coupled device (CCD). The results thus obtained are shown in FIG. 8, in which the solid line represents theoretical results of the contact angle calculated according to the Lippmann-Young equation.

Figure 8:
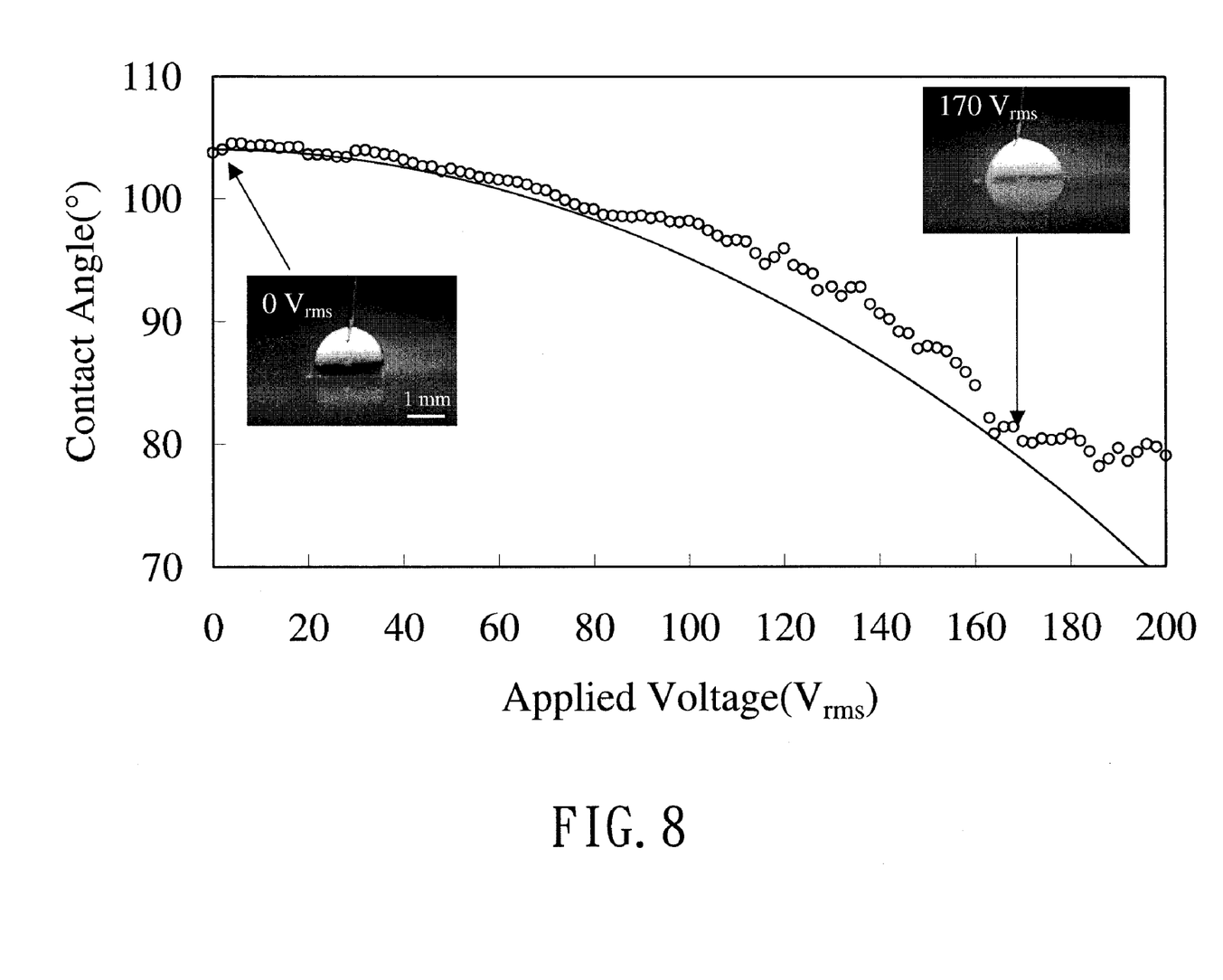
FIG. 8 is a plot of a contact angle of a liquid droplet of the first preferred embodiment under different applied voltages.

In FIG. 8, the contact angle of the variable focus lens of Example 1 decreased from 104° to about 80° when the applied voltage increased from $0\,V_{rms}$ to $170\,V_{rms}$.

Figure 9A:
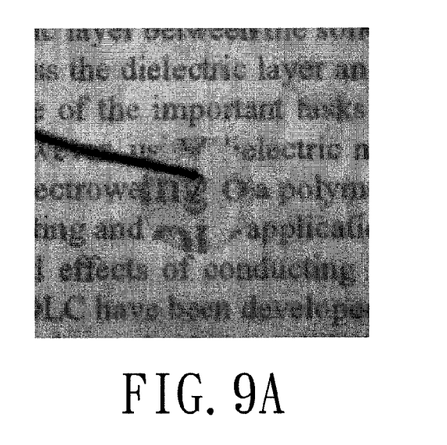
FIGS. 9A and 9B are photo images of display results of the first preferred embodiment under off and on states, respectively.
Figure 9B:
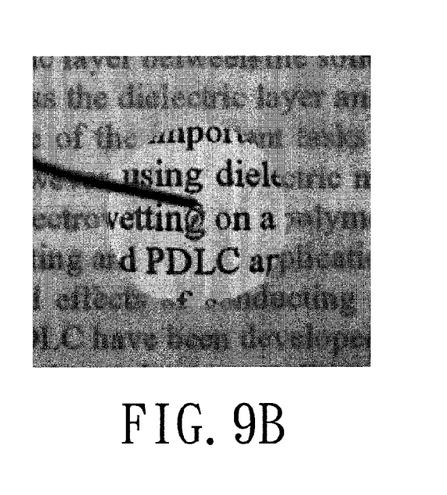

2. Image Clarity and Contrast:

In the test, a printed article was placed under the variable focus lens of Example 1. FIGS. 9A and 9B are photo images of display results of the variable focus lens of Example 1 under off and on states, respectively. The results show that when the variable focus lens of Example 1 is at the on state, the clarity and the contrast of displaying the printed article covered by the segment 301 of the dielectric layer 3 are significantly enhanced as compared to those of FIG. 9A, and are superior over those of the Comparative Example of the aforesaid conventional liquid lens 10 (see FIGS. 2A and 2B).

3. Transmittance Test:

The transmittance of the electro-optical device in Example 2 was measured at 400~800 nm of wavelength of the incident light under different applied voltages. The results thus obtained are shown in FIG. 10.

Figure 10:
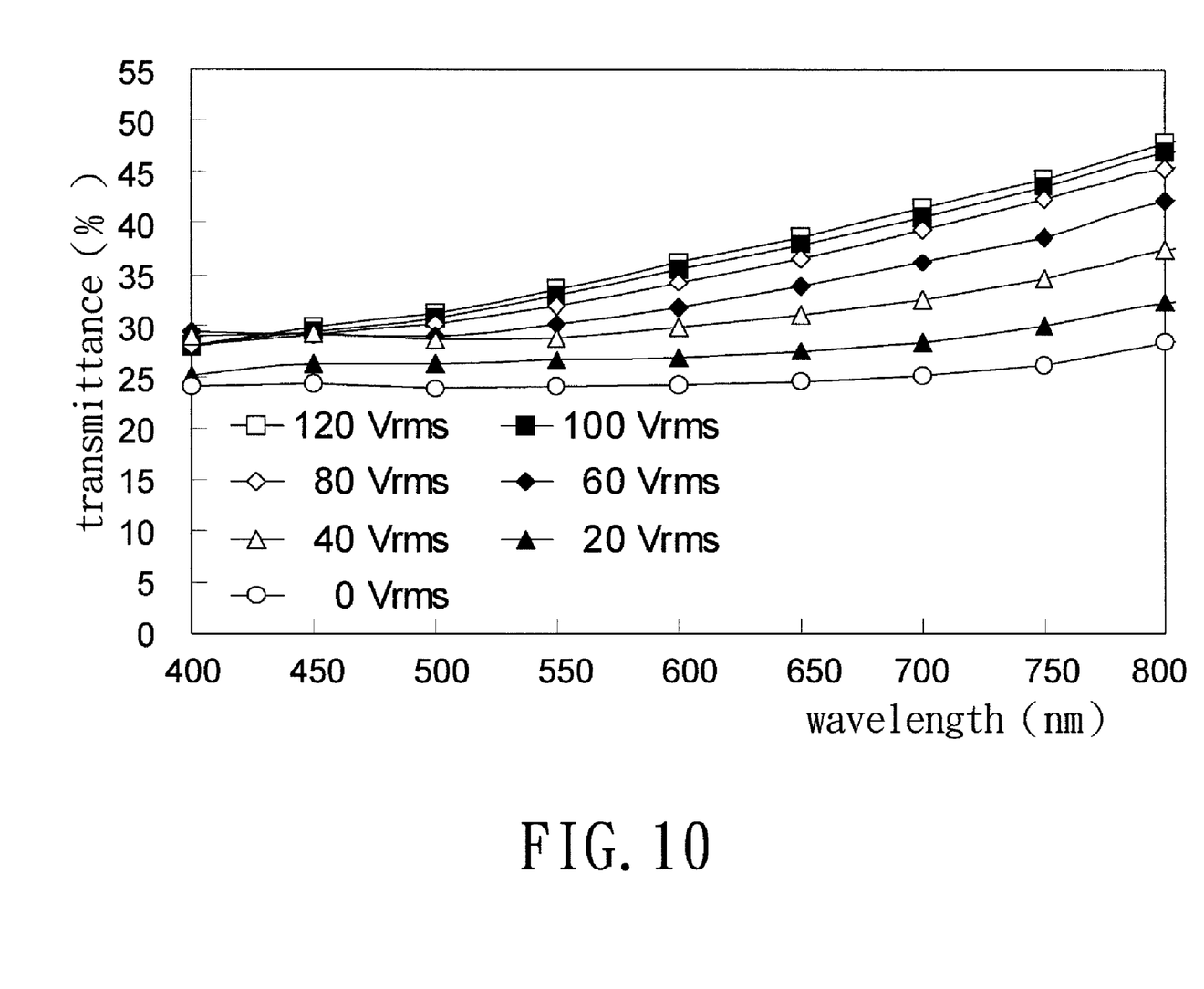
FIG. 10 is a plot of the transmittance of the second preferred embodiment under different applied voltages.

In FIG. 10, the transmittance of the electro-optical device in Example 2 increased with the applied voltage.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An electro-optical device comprising:
   a body of fluid;
   a lower conductor layer disposed below said body of fluid; and
   a dielectric layer disposed between said body of fluid and said lower conductor layer, connected to said lower conductor layer, and supporting said body of fluid, said dielectric layer including a matrix of a dielectric material and a liquid crystal material disposed in said matrix and including liquid crystal molecules, said dielectric layer having a segment disposed adjacent to said body of fluid; wherein when said segment of said dielectric layer is exposed to an electric field, said body of fluid undergoes electrowetting or dielectrophoresis mechanism and the orientation of said liquid crystal molecules that are disposed in said segment of said dielectric layer is changed,
   wherein said body of fluid is conductive and is in the form of a liquid droplet, said lower conductor layer including a plurality of electrodes, said dielectric layer including a plurality of said segments overlapping said electrodes of said lower conductor layer, respectively, when one of said segments of said dielectric layer is exposed to the electric field and when said body of fluid is disposed above and covers an adjacent one of said segments of said dielectric layer, that is adjacent to said one of said segments of said dielectric layer, and a portion of said one of said segments of said dielectric layer, said body of fluid undergoing electrowetting mechanism so as to be moved from said adjacent one of said segments to said one of said segments to cover entirely said one of said segments of said dielectric layer.

2. The electro-optical device of claim 1, wherein said matrix is a polymer, and said liquid crystal material includes a plurality of droplets of said liquid crystal molecules dispersed in said polymer.

3. The electro-optical device of claim 1, wherein said body of fluid is conductive and is in the form of a liquid droplet, and said segment of said dielectric layer is covered by said body of fluid so that said body of fluid undergoes electrowetting mechanism when said segment of said dielectric layer is exposed to the electric field.

4. The electro-optical device of claim 3, further comprising a confining wall that is disposed above said dielectric layer and that defines an inner space for receiving said body of fluid.

5. The electro-optical device of claim 4, further comprising a dielectric oil that is received in said inner space and that is immiscible with said body of fluid.

6. The electro-optical device of claim 5, wherein said body of fluid is surrounded by said dielectric oil.

7. An electro-optical device comprising:
   a body of fluid;
   a lower conductor layer disposed below said body of fluid;
   a dielectric layer disposed between said body of fluid and said lower conductor layer, connected to said lower conductor layer, and supporting said body of fluid, said dielectric layer including a matrix of a dielectric material and a liquid crystal material disposed in said matrix and including liquid crystal molecules, said dielectric layer having a segment disposed adjacent to said body of fluid; wherein when said segment of said dielectric layer is exposed to an electric field, said body of fluid undergoes electrowetting or dielectrophoresis mechanism and the orientation of said liquid crystal molecules that are disposed in said segment of said dielectric layer is changed; and
   an upper conductor layer disposed above said body of fluid, said body of fluid being in the form of a dielectric liquid droplet, said lower conductor layer including a plurality of electrodes, said dielectric layer including a plurality of said segments overlapping said electrodes of said lower conductor layer, respectively, when one of said segments of said dielectric layer is exposed to the electric field and when said body of fluid is disposed above and covers an adjacent one of said segments of said dielectric layer that is adjacent to said one of said segments of said dielectric layer, said body of fluid undergoing dielectrophoresis mechanism so as to be moved from said adjacent one of said segments of said dielectric layer to said one of said segments of said dielectric layer.

8. The electro-optical device of claim 7, wherein said matrix is a polymer, and said liquid crystal material includes a plurality of droplets of said liquid crystal molecules dispersed in said polymer.

9. The electro-optical device of claim 7, wherein said body of fluid is conductive and is in the form of a liquid droplet, and said segment of said dielectric layer is covered by said body of fluid so that said body of fluid undergoes electrowetting mechanism when said segment of said dielectric layer is exposed to the electric field.

10. The electro-optical device of claim 9, further comprising a confining wall that is disposed above said dielectric layer and that defines an inner space for receiving said body of fluid.

11. The electro-optical device of claim 10, further comprising a dielectric oil that is received in said inner space and that is immiscible with said body of fluid.

12. The electro-optical device of claim 11, wherein said body of fluid is surrounded by said dielectric oil.

* * * * *